US008567079B2

(12) United States Patent
Cerwin

(10) Patent No.: US 8,567,079 B2
(45) Date of Patent: Oct. 29, 2013

(54) CONSTRUCTION LAYOUT TOOL WITH LINE GUIDE

(76) Inventor: Chad William Cerwin, Durango, CO (US)

(*) Notice: Subject to any disclaimer, the term of this patent is extended or adjusted under 35 U.S.C. 154(b) by 256 days.

(21) Appl. No.: 12/910,026

(22) Filed: Oct. 22, 2010

(65) Prior Publication Data

US 2011/0061252 A1 Mar. 17, 2011

Related U.S. Application Data

(63) Continuation-in-part of application No. 12/428,251, filed on Apr. 22, 2009, now abandoned.

(60) Provisional application No. 61/047,042, filed on Apr. 22, 2008.

(51) Int. Cl.

| | |
|---|---|
| ***B44D 3/38*** | (2006.01) |
| ***G01B 3/56*** | (2006.01) |
| ***G01B 5/24*** | (2006.01) |

(52) U.S. Cl.
USPC .................. 33/414; 33/1 LE; 33/1 G; 33/1 N

(58) Field of Classification Search
USPC ......... 33/1 G, 1 N, 1 LE, 404, 413, 414, 429, 33/471, 518, 756, 758, 759, 770
See application file for complete search history.

(56) References Cited

U.S. PATENT DOCUMENTS

| | | | | |
|---|---|---|---|---|
| 1,307,987 A * | 6/1919 | Rived | | 33/369 |
| 1,368,857 A * | 2/1921 | Stevens | | 33/1 R |
| 2,872,733 A * | 2/1959 | Chew | | 33/1 LE |
| 2,950,536 A * | 8/1960 | Hellwig | | 33/413 |
| 3,066,416 A * | 12/1962 | Gutting | | 33/1 F |
| 4,095,343 A * | 6/1978 | McPhail | | 33/1 LE |
| 4,731,933 A * | 3/1988 | Cope | | 33/414 |
| 6,374,504 B1 | 4/2002 | Graham | | |
| 2006/0156558 A1 | 7/2006 | Owens | | |
| 2006/0201009 A1 | 9/2006 | Moss | | |
| 2008/0256810 A1* | 10/2008 | Akihary | | 33/1 N |

* cited by examiner

*Primary Examiner* — R. A. Smith
(74) *Attorney, Agent, or Firm* — Marsh Fischmann & Breyfogle LLP; Kent A. Fischmann

(57) ABSTRACT

A layout tool is provided with markings (508) and an anchor post (502) for anchoring a layout line, such as a chalk line, in relation to a piece of construction material. The tool (500) includes a chalk line guide assembly (510) comprising a mounting plate (514) which carries a chalk line guide post (512) and a securing mechanism (516) for securing the chalk line guide post (512) and plate (514) at a desired position along an arcuated groove (506) formed in the surface (504). A worker can secure the tool (500) to a work piece and attach a layout line to the anchor post (502). Thereafter, the worker can disengage the securing mechanism (516) to allow movement of the chalk line guide post (512) and plate (514) to a desired position in the slot (506) corresponding to a desired angular orientation of the layout line.

10 Claims, 5 Drawing Sheets

CONSTRUCTION LAYOUT TOOL WITH LINE GUIDE

CROSS-REFERENCE TO RELATED APPLICATION

This application is a continuation-in-part of U.S. patent application Ser. No. 12/428,251, entitled, "CONSTRUCTION LAYOUT TOOL," filed on Apr. 22, 2009, which claims priority from U.S. Provisional Application No. 61/047,042, entitled, "CONSTRUCTION LAYOUT TOOL," filed on Apr. 22, 2008, the contents of both which are incorporated herein as if set forth in full.

FIELD OF THE INVENTION

The invention is related to the field of hand tools for use in construction projects, and in particular, to a tool for marking a layout on a piece of construction material and associated methodology for using the tool.

BACKGROUND OF THE INVENTION

In construction projects, it is often necessary to make layout lines or markings on a piece of construction material such as a sheet of plywood, foam material sheet, or oriented strand board (OSB). For example, the layout lines may be used in a subsequent process to cut the construction material or to orient other construction materials or tools in relation to the marked construction material. Current processes for laying out construction materials are time consuming or cumbersome to use, and can often result in layout errors and wastage of materials. These processes are particularly problematic where it is desired to precisely mark non-square or oblique (acute or obtuse) angles in relation to an edge of the construction material.

In many cases, the layout process is facilitated by use of a chalk line. A chalk line is a line of string or cord coated with chalk. The chalk line is typically attached to the construction material at one edge of the line, e.g., by attaching a loop or hook of the chalk line to a nail or otherwise holding the end of the chalk line at the desired position. The chalk line is then carefully stretched over the construction material to the desired line length and orientation, and the opposite end of the chalk line is secured or held in place. The chalk line can then be lifted slightly from the construction material between the secured ends and allowed to snap against the construction material. The chalk coating then leaves a chalk line on the material for use in a subsequent construction process as noted above. When employed by a skilled construction worker, this process can yield a straight line of the desired length and orientation on the construction material.

One of the most time-consuming and error prone aspects of such layout processes is executing layouts at oblique angles. It will be appreciated that angled layouts are commonly required for construction materials used in constructing roofs, floors, walls and other structural elements. A particular project may require a layout line at any angle between 0-180° in relation to an edge of a piece of construction material. To execute such angled layouts, a variety of methods may be used. For example, a construction worker may attempt to place a protractor adjacent to the first end of the chalk line and then use the markings on the protractor to orient the chalk line. However, it is difficult to maintain the protractor at the appropriate position and orientation in relation to the construction materials and to secure the first end of the chalk line at the protractor center point as is necessary to obtain accurate results. This generally requires two workers; one to manage the protractor and another to position the second end of the chalk line and snap the chalk line. Alternatively, the position of the second end may be calculated in relation to the construction material rather than determined based on an angle from the first end of the chalk line. However, this requires a calculation process and introduces additional sources of potential error as the positions of each end of the chalk line are determined independently.

SUMMARY OF THE INVENTION

The present invention relates to a construction layout tool and associated method for use that facilitates the layout of construction materials by making a layout line or other markings with respect to substantially any desired orientation. The invention can be used to anchor a chalk line (or other string, cord or the like) and directly orient the chalk line at the desired angle in relation to the anchor point so that layout markings can be made quickly and accurately and with minimal risk of error and material wastage.

In accordance with one aspect of the present invention, a hand tool is provided for marking a layout on a piece of construction material. The hand tool includes a substantially planar top portion for laying over the piece of construction material. The planar portion preferably includes indicia indicative of a plurality of orientations. For example, the top portion may be formed from plastic, aluminum or other appropriate material and may be of any suitable size and configuration. The markings may indicate angles in terms of degrees (markings for each individual degree or on a multiple degree—e.g., 5°—basis), markings calibrated for roof pitches, or any other manner indicating angular orientations. The hand tool further includes structure for securing the tool to the piece of construction material and structure for use in detachably coupling a layout line to the tool for marking a layout on the construction material. The tool may be secured to the piece of construction material in various ways. For example, the hand tool may include a depending portion for securely butting against a side edge of the piece of construction material, a spike for digging into the piece of construction material, frictional or adhesive materials for securing the tool to the piece of material, a magnet for securing the tool to a metal material, an opening for securing the tool to the piece of material using a nail or bolt, and/or other securing structure. The layout line may be secured to the tool by way of a post or the like for receiving a loop or hook of the layout line. The post is preferably disposed in a defined relationship, e.g., a center point, in relation to the indicia. The layout tool may further include structure for enabling viewing of the markings on the construction materials so as to facilitate proper positioning of the tool in relation to the construction material. For example, an opening may be provided in the top portion or at least an area of the top portion may be formed from transparent or translucent material.

It should be noted that the hand tool is useful to anchor one end of the layout line even when the guidance of markings is not used to orient the layout line. For example, a worker may use the tool in a case where the workpiece has been marked on each of first and second edges (e.g., a "short end mark" and a "long end mark"). In such a case, the worker may secure the tool to one edge of the workpiece so that the post of the tool is aligned with the mark (e.g., the short end or long end mark) on one of the edges. The worker can then extend the layout line to the mark (e.g., the long end or short end mark) on the other edge. The line can then be snapped or otherwise used to mark or process the workpiece. In this manner, the tool can be used for accurate layout of the workpiece by a single worker. Thus, the tool may be formed in a variety of configurations and constructed without markings and still have significant benefits.

In accordance with another aspect of the present invention, a layout tool includes a line guide (hereinafter "chalk line guide") to assist in positioning a layout line at a desired orientation. As noted above, in some cases, it is desired to allow the layout tool to be operated by a single user. This is convenient during the construction process and may reduce labor costs. However, one difficulty associated with operation by a single user is that it may be difficult for that user to read orientation markings on the layout tool from a distance. That is, the single user will typically hold a distal end of the layout line, remote from the location where the line is secured to the tool while the line is being positioned in the desired orientation. In cases where it is desired to execute the layout on a large piece of construction material, that user may be at a substantial distance from the location where the layout line is attached to the tool and may be unable to accurately read orientation markings.

This is addressed in accordance with the present invention by providing a construction layout tool with a chalk line guide. Specifically, the layout tool includes a substantially planar top portion that preferably includes indicia indicative of a number of orientations. The tool further includes structure (such as a spike, frictional or adhesive materials, a magnet, or the like as described above) for securing the tool to a piece of construction material and structure (such as a post, clip, screw, or the like) for detachably coupling a layout line (e.g., a chalk line) to the tool. The tool further includes structure for facilitating orientation of the chalk line at a desired orientation by a user holding a distal portion of the chalk line at a distance from the indicia. For example, a chalk line guide may be provided that can be moved to a desired position and secured in that position. In one embodiment, a groove is formed in the planar top portion and the chalk line guide includes a guide surface extending upwardly from a base. The base is configured to travel in the groove and may include a clamping structure such as a wing nut, a spring-loaded detent, or notches to secure the chalk line guide at the desired position in the groove. The chalk line can then be positioned in relation to the chalk line guide (e.g., moved until the line touches an edge of the chalk line guide) without direct reference to any markings on the tool.

Thus, the chalk line guide changes the relationship between the chalk line and the markings. Without the chalk line guide, the chalk line is aligned with the markings to find the desired angle. With the chalk line guide, the guide is aligned with the markings and secured at the desired angle. The chalk line can then be positioned by reference to the chalk line guide without reference to the markings. As a practical matter, this makes single worker operation possible for many normal layout procedures.

In accordance with another aspect of the present invention, a method is provided for use in marking a layout on a piece of construction material. The method involves providing a hand tool, such as described above, for use in marking a layout on a piece of construction material; securing the tool to the piece of construction material; attaching a layout line to the tool; using indicia of the layout tool to extend the layout line in a desired orientation in relation to the piece of construction material and using the layout line to make at least one mark on the piece of construction material. As noted above, a chalk line guide may be used so that the chalk line need not be directly aligned with the markings. Rather, the chalk line guide can be aligned with the markings and then the chalk line guide can be used to position the chalk line. The tool may be positioned in relation to the construction material such that the indicia are in defined relationship to a selected point on the construction material. For example, a post of the tool for receiving one end of the layout line may be aligned with a mark on the construction material. A guide provided in connection with the construction tool may facilitate such alignment with respect to at least one dimension. An opening, window, or similar structure may facilitate alignment with respect to at least one additional dimension.

The invention thus allows for convenient and accurate layout of construction materials including markings made at desired angular orientations. In this manner, the time required for layout is reduced, accuracy is enhanced, material wastage is avoided, and overall product costs are reduced. Advantageously, the invention enhances the efficiency of a layout by permitting a single user to connect, orient, and snap chalk lines on a piece of material.

BRIEF DESCRIPTION OF THE DRAWINGS

For a more complete understanding of the present invention and further advantages thereof, reference is now made to the following detailed description taken in conjunction with the drawings in which.

DESCRIPTION OF THE INVENTION

In the following description, the invention is set forth in the context of specific embodiments of a construction layout tool. While specific embodiments are described in detail for purposes of illustration, those skilled in the art will readily appreciate that additional implementations are possible in accordance with the present invention. Accordingly, the following description should be understood as illustrating the principles of the invention and not by way of limitation.

Figure 1A:
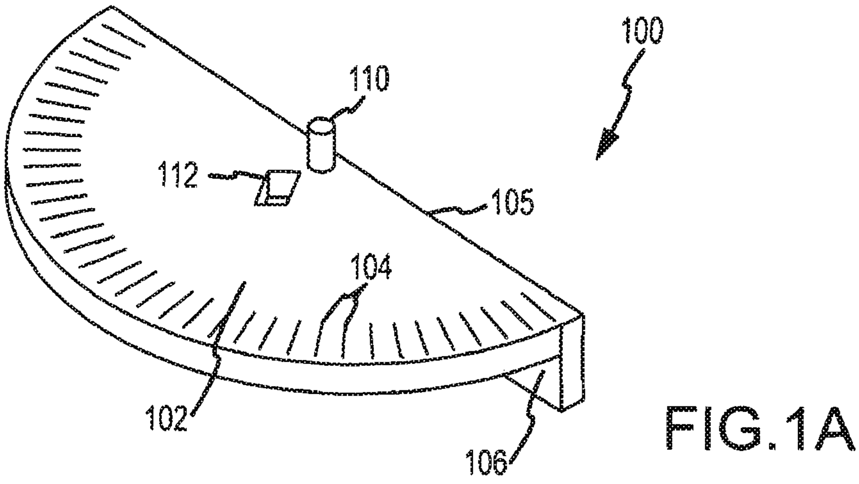
FIGS. 1A-1C illustrate perspective, side, and front views, respectively, of a layout tool according to the present invention.
Figure 1B:
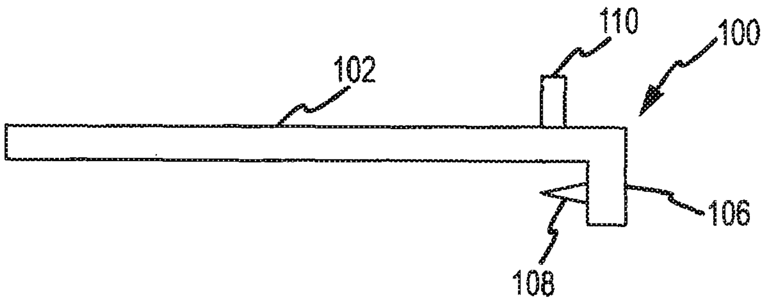
Figure 1C:
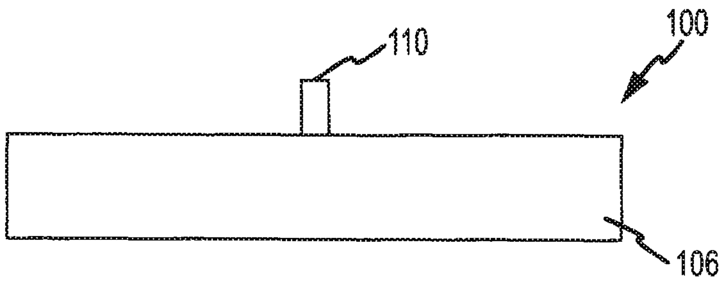

Referring to FIGS. 1A-1C, a construction tool 100 in accordance with the present invention is shown. The illustrated constriction tool 100 generally includes a top plate 102 and a depending plate 106. The tool 100 may be constructed of any appropriate materials such as plastic, aluminum or other metals or other materials. Moreover, although the illustrated top plate 102 and depending plate 106 are shown as being constructed from an integral web of material, the plates 102 and 106 may be formed in multiple interconnected segments and may be formed from different materials. For example, it may be desired to construct the upper plate 102, in whole or in part, from transparent plastic and to construct the depending plate 106 from aluminum or another material that can withstand striking with a hammer or mallet.

The plates 102, 106 may be of any desired size and configuration. On the illustrated embodiment, the top plate 102 is formed in a generally semicircular configuration and includes angular markings 104 extending over an angular range of approximately 180°. This configuration is useful as it encompasses the full range of angular orientations that might normally be addressed by a construction worker and covers only as much of the surface of the piece of construction material as is needed to provide the desired angular guidance. However, it will be appreciated that other configurations are possible. For example, the upper plate 102 may be rectangular or square. In this regard, the upper face 102 may be formed from transparent plastic and may still include a semicircular (or other) array of markings 104 as shown. As a further alternative, the top plate 102 may be configured as a quarter circle and include markings extending over only a 90° range. In such a case, the plate 106 may extend both above and below the top face 102 so that the tool can be flipped over to enable marking of both acute and obtuse angles. Of course, in that case, appropriate markings may be provided on both sides of the top plate.

The illustrated plate 102 can be provided in any suitable dimensions. For example, the semicircular plate 102 may have a radius of between about 2 and 12 inches. In this regard, a smaller dimension may be more convenient for carrying in a pocket, tool belts, or tool box, whereas a larger dimension may enable greater angular resolution of the layout. Other considerations in this regard relate to how much of the construction material is covered and whether the tool is intended for use in making long or short layout lines. In the illustrated embodiment, the radius of the plate 102 is about 3 inches.

The depending plate 106 is useful in aligning the tool 100 to a piece of construction material. Specifically, the depending plate 106 can be butted against an edge of the construction material with the top plate 102 overlaying a top surface of the material. In this manner, the depending plate 106 is effective to align the tool 100 with respect to one dimension of the construction material, as will be discussed in more detail below. In this regard, the plate 106 preferably extends continuously or intermittently along at least a portion of the edge 105 of plate 102. The height of the plate 106 is sufficient to provide this alignment function but is preferably not so great, in relation to the thickness of expected construction materials, so as to inhibit the top plate 102 from laying flat on the upper surface of the construction material. In this regard, the plate 106 may extend between about ¼ inch and 2 inches from the bottom surface of the plate 102. In the illustrated embodiment, the plate 106 extends about ½ inch from the bottom surface of the plate 102.

The illustrated tool 100 further includes a layout line anchor post 110, a spike 108 and a window or opening 112. The opening 112 allows the user to view alignment markings on the piece of construction material. The post 110 receives a loop or hook of a layout line such as a chalk line. Any appropriate structure for attaching a layout line may; be used in place of the post. For example, an opening may be provided in the plate 102 at the position of the post 110 to receive a push pin associated with a layout line, or a pin, clamp or the like may be used to engage a layout line. Alternatively, a string, cord or the like may be attached to the post 110, for example, in cases where it is desired to make only a single mark or a number of marks, rather than a line for purposes of the layout desired. The spike 108 is used to secure the tool 100 to the piece of construction material.

Thus, in operation, a construction worker may make a mark such as a pencil line on a piece of construction material to indicate the position of a first end (e.g., corresponding to a long or short point) of a layout line such as a chalk line. The construction worker can then align the tool 100 with the mark on the construction material by viewing the mark through the opening 112. Next, the construction worker can tap on plate 106 with a hammer or mallet such that the spike 108 penetrates a side surface of the construction material so as to secure the tool 100 in the desired position. In this regard, it will be appreciated that the illustrated construction tool 100 is intended for use in connection with certain wood, foam, composite and other materials that may be readily penetrated by the spike 108. Alternative embodiments of the tool 100 may be used in connection with other materials.

It will be appreciated that the tool 100 is thereby fully aligned with the construction material in the desired position and orientation. In this regard, the spatial relationship of the depending plate 106, the post 110 and the markings 104 is such that, when the tool 100 is secured to the construction material, the markings 104 corresponding to a 0° configuration and 180° configuration are aligned with an edge of the construction material, and the post 110 is disposed substantially at a center point of the markings 104 on a line including the 0° and 180° markings. In the case of a chalk line, the chalk line can then be attached to the post 110 and extended a desired length across the construction material in a desired angular orientation by using the angular markings 104. The second end of the chalk line can then be held to the upper surface of the construction material or secured to the construction material and snapped against the construction material to provide the desired layout chalk line.

Figure 2A:
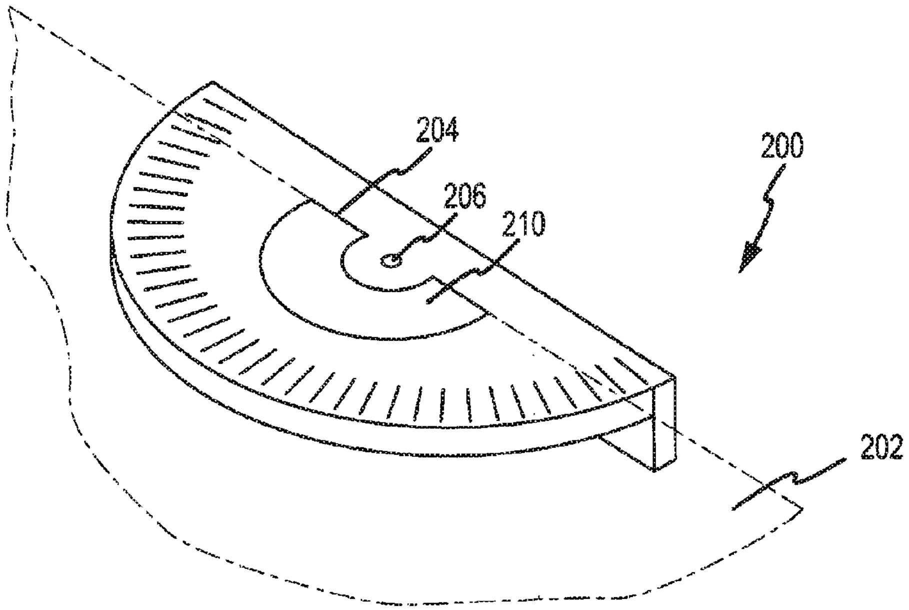
FIGS. 2A-2C illustrate perspective, side, and front views, respectively, of an alternative embodiment of a layout tool in accordance with the present invention.
Figure 2B:
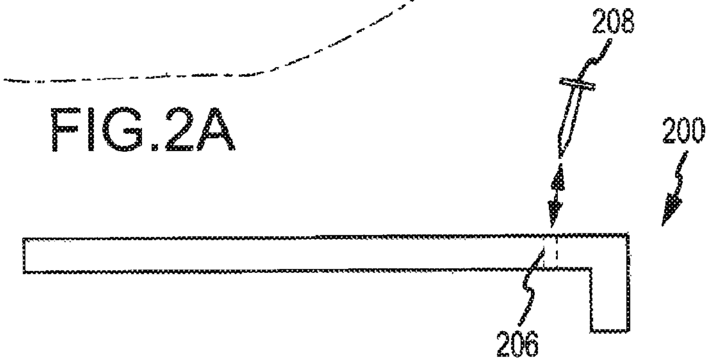
Figure 2C:
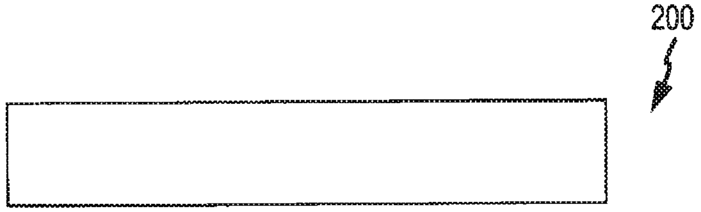

FIGS. 2A-2C show an alternative embodiment of a construction tool 200 in accordance with the present invention. The construction is generally similar to that of FIGS. 1A-1C except that the layout line anchor post and spike are omitted. Instead, an opening 206 is provided in a center section 204 of the tool 200 for use as will be described below. In addition, the illustrated tool 200 includes a generally semicircular and annular window 210 for viewing alignment marks on the construction material and allowing for layout line segments within the periphery of the tool 200.

In the illustrated embodiment, a separately provided nail 208, pin, screw, or the like can be inserted through the opening 206 into the construction material 202. In this manner, the nail 208 secures the tool 200 to the construction material 202 and also functions as an anchor post for attachment of a layout line. This simplifies construction of the tool 200 somewhat and avoids the need for an integral spike. For example, the embodiment of FIG. 2A-2C may be preferred for use in tight working environments where it is difficult to sink the spike into the side of the construction material or by construction workers who are bothered by an exposed spike.

Figure 3A:
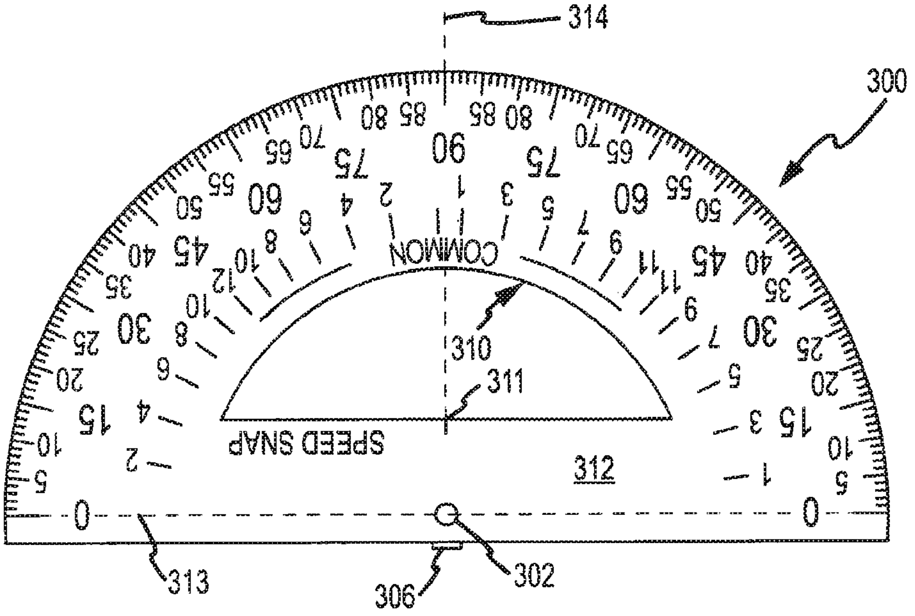
FIGS. 3A-3C illustrate top, side, and front views, respectively, of a further embodiment of a layout tool in accordance with the present invention.
Figure 3B:
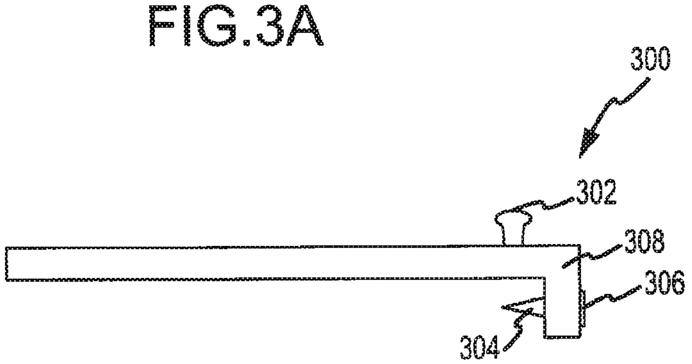
Figure 3C:
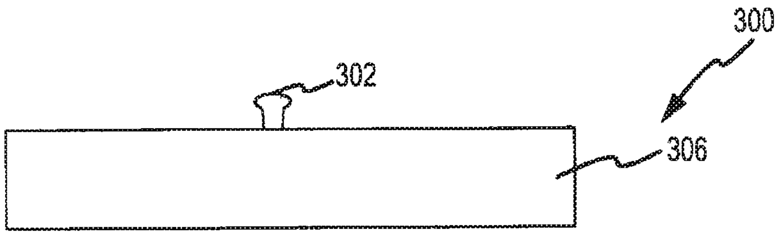

FIGS. 3A-3C show a still further embodiment of a tool 300 in accordance with the present invention. The tool 300 has a construction that is generally similar to the tool of FIGS. 1A-1C. In this regard, the illustrated tool 300 includes a layout line anchor post 302, as generally described above, and a spike 304 for securing the tool 300 to a piece of construction material. The illustrated spike 304 is associated with a head 306 that extends from the surface of the depending plate 308. A construction worker can tap on the head 306 using a hammer or mallet. The head 306 thus concentrates the force of such a strike on the spike 304 and reduces the potential that such strikes will damage or disfigure the plate 308.

FIG. 3A also shows an example of markings 310 that may be provided on the top plate 312 of the tool 300. In this case, the markings 310 include, at an outer periphery of the tool 300, conventional degree markings on a per degree basis. Common orientation lines, such as every 15 degrees may be emphasized as shown. Any desired convention may be used for designating the angles. In the illustrated embodiment, degree designations from 0° to 90° are used on either side of a center line 314 of the tool 300. It will be appreciated, however, that other conventions such as designation from the degrees from 0° to 180° may be employed if desired. The illustrated markings 310 are also calibrated towards an inner edge of the tool 300 for roof pitches. Any other appropriate markings for indicating useful angular orientations may be provided and different types of markings may be provided for different types of construction workers or other tool users. The illustrated tool 300 further includes an alignment mark 311 for use in aligning markings on the construction material with the post 302 and alignment line 313 for verifying alignment of the tool 300 with an edge of the construction material.

Figure 4:
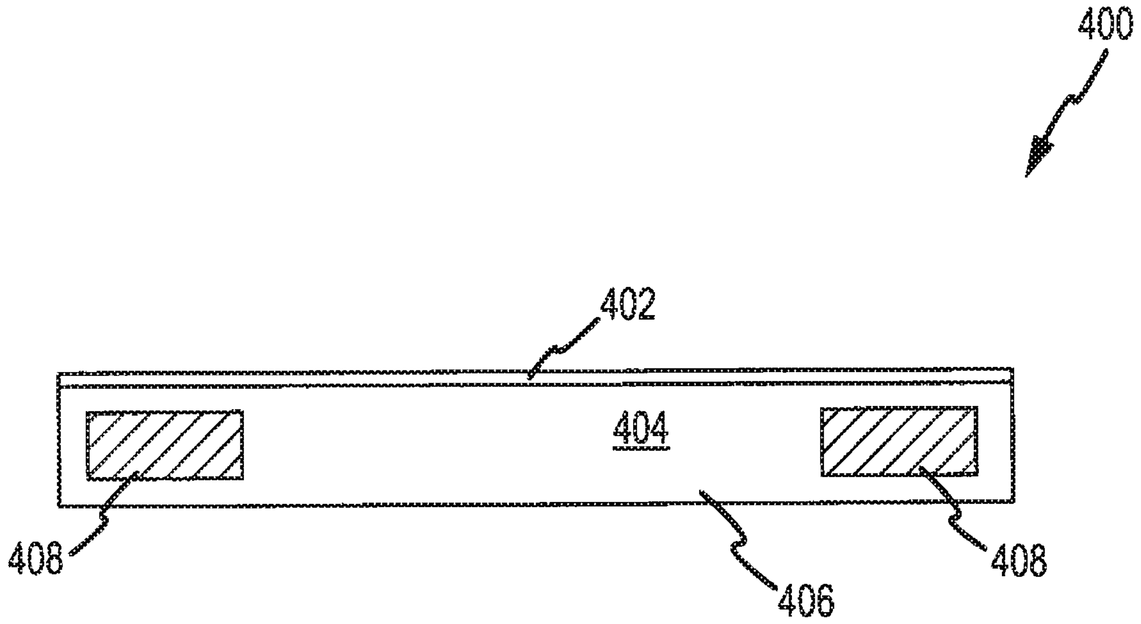
FIG. 4 is a rear view of a still further embodiment of a layout tool in accordance with the present invention.

FIG. 4 shows a still further alternative embodiment of a construction tool 400 in accordance with the present invention. In some cases, it may be desired to secure the tool 400 to a piece of construction material without penetrating the construction material. For example, this may be useful where it is not desired to leave a hole in the construction material or where the construction material is formed from metal or other material that is not easily penetrated. FIG. 4 shows a tool 400 that can be used in such environments. In this regard, the tool 400 generally has a construction similar to that of the embodiment of FIGS. 1A-1C. The illustrated depiction is a rear view showing an end on view of the top plate 402 and a full view of the building material contact surface 404 of the depending plate 406. The illustrated tool 400 includes securing surfaces 408 extending across at least a portion of the contact surface 404. The securing surfaces 408 are effective to frictionally or adhesively secure the tool 400 to the construction material. In this regard, the surfaces 408 may be provided via roughened surface areas of the surface 406 separately applied friction tape or other grit surfaces, a tacky or adhesive material, magnets or other structure for inhibiting relative motion between the surface 406 and a side of the construction material.

Figure 5:
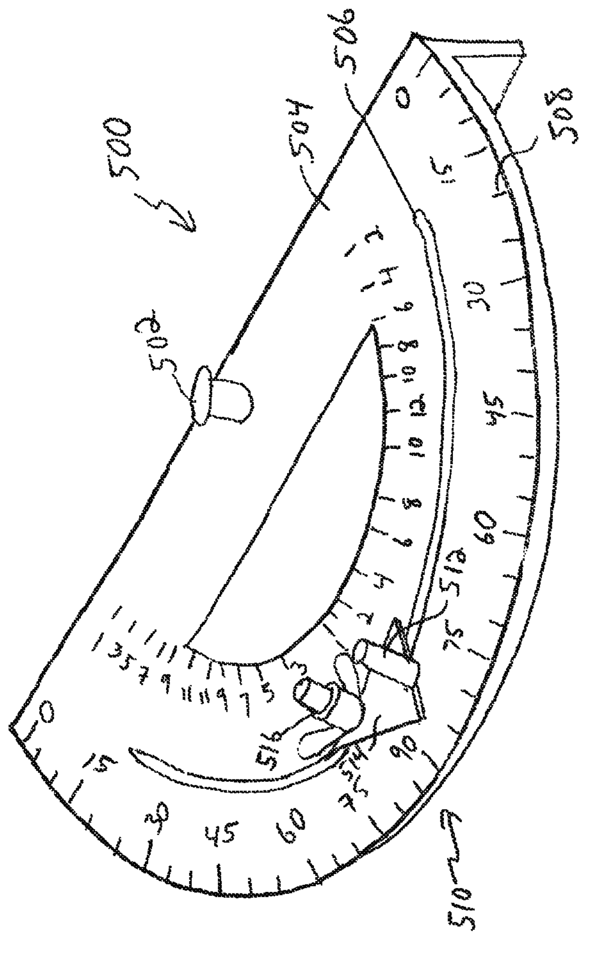
FIG. 5 is a perspective view showing a layout tool with a chalk line guide in accordance with another aspect of the present invention.

FIG. 5 is a perspective view showing a layout tool 500 with a chalk line guide in accordance with another aspect of the present invention. As noted above, when the layout tool is operated by a single worker, it may be difficult for the worker to read the markings on the surface of the tool. That is, because the worker will generally hold a distal end of the chalk line at some distance from the tool, the worker may have difficulty in reading the markings, which may lead to mistakes with attendant and waste of time and materials. The tool 500 of FIG. 5 alleviates these concerns.

Specifically, the tool 500 has a construction generally similar to the embodiments described above including an upper surface 504 with markings 508 thereon, as well as an anchor post 502 for attaching a layout line, e.g., chalk line or the like. The illustrated tool 500 further includes a chalk line guide assembly 510. The chalk line guide assembly 510 includes a chalk line guide post 512 carried by a mounting plate 514. The chalk line guide post 512 and plate 514 travel arcuately about the anchor post 502 in groove 506 formed in the surface 504. The assembly 510 further includes a securing mechanism 516 for securing the chalk line guide post 512 and plate 514 at a desired position in the groove 506.

In operation, a worker can secure the tool 500 to a work piece and attach a layout line to the anchor post 502 as described above. Thereafter, the worker can disengage the securing mechanism 516 to allow movement of the chalk line guide post 512 and plate 514 to a desired position in the slot 506 corresponding to a desired angular orientation of the layout line. For example, the desired angular orientation may be established by confirming that a front end of the plate 514 is aligned with the appropriate markings 508, by moving the layout line against a surface of the chalk line guide post 512 and then moving the line in conjunction with the post 512 until the line is aligned with an appropriate marking 508, by aligning the chalk line guide post 512 with the desired markings, or by any other appropriate technique. For example, alignment markings or a structure may be provided on the plate 514 to assist in positioning the assembly 510 at the desired location. Once the desired positioning is attained, the securing mechanism 516 may be engaged to secure the assembly 510 in the desired position. The worker can then extend the layout line to the desired length, move the layout line until it abuts the chalk line guide post 512, and then, in the case of a chalk line, snap the chalk line or otherwise mark or process the work piece as desired. Thus, the chalk line need not be directly compared to the markings. Rather, the chalk line guide is aligned with the markings and secured in place. Then the chalk line can be positioned solely by reference to the chalk line guide. This enables single worker operation as nobody needs to be close to the tool to view the markings when the chalk line is extended.

The plate 514 in the illustrated embodiment provides a surface that the securing mechanism 516 can bear against to clamp the mechanism 516 to the tool 500 so as to secure the mechanism 516 in place. In this regard, it will be appreciated that the plate 514 may be constructed from a variety of different materials, including plastics and metals, and may be constructed in a variety of different configurations. In the illustrated embodiment, the plate 514 is constructed from a durable metal such as steel or thick gauge aluminum stock. The illustrated plate 514 also has a generally triangular configuration that conveniently provides a radially aligned leading edge that facilitates alignment of the assembly 510 with the markings 508. However, it will be appreciated that alternative configurations, such as rectangular, square, or arcuate shapes, may be used. As noted above, alignment markings or structure (e.g., a point formed into one of the edges of the plate 514) may be provided to facilitate positioning of the mechanism 516 at the desired location in relation to the markings 508.

The illustrated securing mechanism 516 includes a wing nut on a threaded bolt. The wing nut can be conveniently operated by a worker without tools to disengage and engage the securing mechanism 516. However, it will be appreciated that any suitable mechanism for securing the assembly 510 in place may be provided. For example, the plate 512 and tool surface may be formed of magnetic material so that the chalk line guide post 514 is secured in the desired position by magnetic forces. In such a case, the groove 506 may be eliminated. As a further alternative, the groove may be eliminated by constructing the tool so that the chalk line guide assembly travels on a flange, e.g., formed on the outer periphery of the tool. The chalk line guide assembly may be secured and released by any suitable mechanism such as a spring-loaded detent mounted on the assembly or tool surface. Such a detent may cooperate with notches or recesses found on the opposite member (tool surface or assembly) to secure the assembly in a desired position. The notches or recesses may be regularly spaced or provided at common positions, e.g., at common roof pitch angles. Such functionality may be combined with a wing nut or similar mechanism to provide easy and positive registration at common positions as well as substantially continuing or infinite adjustability.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described herein-above are further intended to explain best modes known of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed is:

1. A hand tool for marking a layout on a piece of construction material, the hand tool comprising:

a substantially planar top portion;

indicia disposed on the top portion indicative of a plurality of orientations;

first structure for securing the tool to the piece of construction material;

second structure for use in detachably coupling a layout line to the tool for marking the layout on the construction material using the indicia; and third structure for facilitating orientation of the layout line at a desired orientation by a user holding a distal portion of the layout line at a distance from said indicia, wherein said third structure comprises a layout line guide for providing a visual indication that the layout line is in said desired orientation, said third structure being adapted to be moved to a desired position, corresponding to said desired orientation in relation to said indicia an to be secured in said desired orientation, wherein said third structure comprises a guide surface extending upwardly from a base, said base being configured to travel in a groove formed in said planar top portion.

2. The hand tool as set forth in claim 1, wherein said third structure comprises clamping structure for clamping said layout line guide to said planar top portion in said desired position.

3. A hand tool as set forth in claim 1 further comprising:

an aperture defined in the top portion of the tool for viewing a mark made by a user on the construction material, wherein the mark is usable to position the tool relative to the material for marking the layout.

4. A hand tool as set forth in claim 1, wherein said substantially planar top portion is configured as substantially one of a half circle and a quarter circle.

5. A hand tool as set forth in claim 1, wherein said indicia indicate one of angle notations and pitch notations.

6. A hand tool as set forth in claim 1, wherein said first structure comprises a depending portion, interconnected to said top portion, for butting against a said surface of said piece of construction material.

7. A hand tool as set forth in claim 1, wherein said first structure comprises a pointed element for penetrating said piece of construction material.

8. A hand tool as set forth in claim 1, wherein said first structure comprises an element for engaging a surface of said piece of material free from penetration thereof.

9. A hand tool as set forth in claim 1, wherein said second structure comprises a post for interconnecting the layout line to the tool.

10. A hand tool for marking a layout on a piece of construction material, the hand tool comprising:

a substantially planar top portion;

a post disposed on said planar top portion for interconnecting a layout line to a hand tool;

markings disposed on the top portion indicative of a plurality of line orientations in relation to said post; and a layout line guide for providing a visual indication that the layout line is in a desired orientation in relation to said markings, said layout line guide including a guide surface extending upwardly from a base, said base being configured to travel in a groove formed in said planar top surface, wherein said base can be secured to said top portion in a desired position.

* * * * *